(12) United States Patent
Bar Eliyahu et al.

(10) Patent No.: US 11,741,486 B1
(45) Date of Patent: Aug. 29, 2023

(54) MACHINE LEARNING TECHNIQUE WITH TARGETED FEATURE SETS FOR CATEGORICAL ANOMALY DETECTION

(71) Applicant: INTUIT INC., Mountain View, CA (US)

(72) Inventors: Natalie Bar Eliyahu, Azor (IL); Sigalit Bechler, Bney Zion (IL); Gilad Uziely, Hertzelia (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/804,621

(22) Filed: May 31, 2022

(51) Int. Cl.
    *G06N 5/02* (2023.01)
    *G06Q 30/0201* (2023.01)
    *G06Q 40/12* (2023.01)

(52) U.S. Cl.
    CPC ......... *G06Q 30/0201* (2013.01); *G06Q 40/12* (2013.12)

(58) Field of Classification Search
    CPC ......... G06Q 40/00; G06Q 40/12; G06N 5/025
    See application file for complete search history.

(56) References Cited

U.S. PATENT DOCUMENTS

2018/0314835 A1\* 11/2018 Dodson ............... G06F 21/552
2022/0060491 A1\* 2/2022 Achleitner .......... H04L 63/1416

OTHER PUBLICATIONS

Nguyen et al. "CMI: An Information-Theoretic Contrast Measure for Enhancing Subspace Cluster and Outlier Detection", SIAM, 2013, pp. 198-206.\*
Dutta et al. "RODS: Rarity based Outlier Detection in a Sparse Coding Framework", IEEE Trans. KDE, 2016, pp. 483-495.\*

\* cited by examiner

*Primary Examiner* — Li Wu Chang
(74) *Attorney, Agent, or Firm* — Patterson + Sheridan, LLP

(57) ABSTRACT

Aspects of the present disclosure provide techniques for categorical anomaly detection. Embodiments include receiving values for a plurality of data categories for an entity of a plurality of entities. Embodiments include generating a feature vector for the entity based on the values, the feature vector excluding a first value for a first data category of the plurality of data categories. Embodiments include providing one or more inputs to a machine learning model based on the feature vector and determining, based on one or more outputs received from the machine learning model, one or more other entities of the plurality of entities that are grouped with the entity. Embodiments include determining that the first value is anomalous based on respective values for the first data category for the one or more other entities. Embodiments include performing one or more actions based on the determining that the first value is anomalous.

17 Claims, 5 Drawing Sheets

MACHINE LEARNING TECHNIQUE WITH TARGETED FEATURE SETS FOR CATEGORICAL ANOMALY DETECTION

INTRODUCTION

Aspects of the present disclosure relate to techniques for using machine learning with targeted feature sets for categorical anomaly detection.

BACKGROUND

Every year millions of people, businesses, and organizations around the world use electronic financial management systems, such as electronic accounting systems, to help manage their finances. Electronic accounting systems use accounts for categorization of business transactions. Such electronic accounting systems gather data related to financial transactions of the users. The users can then sort the financial transactions into the various accounts in order to track their expenditures and revenues by category. The users can monitor many or all of their financial transactions and other financial matters from a single electronic accounting system and sort them into the various financial accounts. Such an electronic accounting system can help users save time by eliminating the need to check with several different financial institutions in order to manage their finances.

While existing electronic accounting systems allow users to track and manage financial data, these systems are generally limited in their ability to accurately compare categorical data of different users, such as for detecting anomalous values. For example, while existing systems may compare data from users based on attributes such as business type and geographic location, there are many factors that may lead to varying expenses and revenues among users that are not easily identified based on attributes typically analyzed by automated analysis tools.

What is needed is a solution for improved automated cross-user analysis of categorical data.

BRIEF SUMMARY

Certain embodiments provide a method for categorical anomaly detection through machine learning. In one embodiment, a method includes: receiving values for a plurality of data categories for an entity of a plurality of entities; generating a feature vector for the entity based on the values, wherein the feature vector excludes a first value for a first data category of the plurality of data categories; providing one or more inputs to a machine learning model based on the feature vector; determining, based on one or more outputs received from the machine learning model in response to the one or more inputs, one or more other entities of the plurality of entities that are grouped with the entity; determining that the first value is anomalous based on respective values for the first data category for the one or more other entities; and performing one or more actions based on the determining that the first value is anomalous.

Other embodiments provide a method for categorical anomaly detection through machine learning. In one embodiment, the method comprises: receiving values for a plurality of data categories for an entity of a plurality of entities; generating a feature vector for the entity based on the values, wherein the feature vector excludes a first value for a first data category of the plurality of data categories; providing one or more inputs to a machine learning model based on the feature vector; determining, based on one or more outputs received from the machine learning model in response to the one or more inputs, one or more other entities of the plurality of entities that are grouped with the entity; performing an anomaly detection algorithm with respect to the first value and the respective values to determine an anomaly score for the first value; determining that the first value is anomalous based on the anomaly score for the first value exceeding a threshold; and performing one or more actions based on the determining that the first value is anomalous.

Other embodiments provide: an apparatus operable, configured, or otherwise adapted to perform the aforementioned method as well as those described elsewhere herein; a non-transitory, computer-readable media comprising instructions that, when executed by a processor of an apparatus, cause the apparatus to perform one or more of the aforementioned methods as well as those described elsewhere herein; a computer program product embodied on a computer-readable storage medium comprising code for performing one or more of the aforementioned methods as well as those described elsewhere herein; and an apparatus comprising means for performing one or more of the aforementioned methods as well as those described elsewhere herein. By way of example, an apparatus may comprise a processing system, a device with a processing system, or processing systems cooperating over one or more networks.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
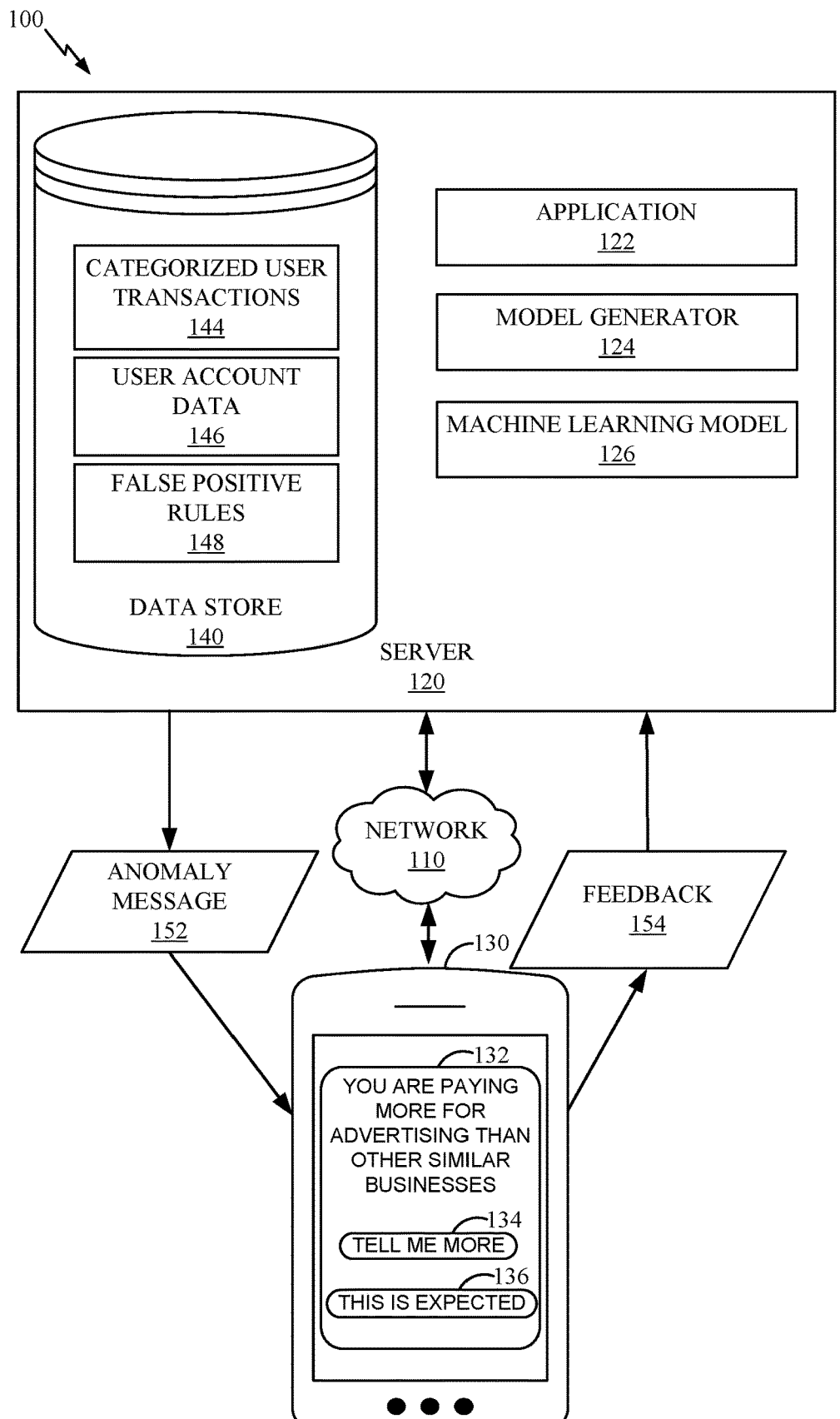
FIG. 1 depicts an example computing environment for categorical anomaly detection through machine learning.

Aspects of the present disclosure relate to categorical anomaly detection through machine learning.

In one example, transactions are categorized into different accounts in a chart of accounts. The chart of accounts includes multiple financial accounts that are used for accounting and for generating financial reports. Once transactions have been categorized into accounts by a plurality of users, this categorical data may be used to provide cross-user insight into expenses and revenues. Advantageously, techniques described herein determine which users are similar to one another through a machine learning technique with targeted features sets, and then identify anomalous values by category (e.g., accounts in the chart of accounts) for a given user based on categorical data from other similar users.

A targeted feature set as discussed herein is a set of descriptive data points about an entity (e.g., a user) that is "targeted" for determining similarity with reference to a particular feature that is being analyzed. A feature for a user may be, for example, an average monthly expense total for a particular category (e.g., account). According to certain embodiments, rather than determining similarities of users based solely or primarily on user attributes such as a business type, business size, and/or the like, user similarity is determined based on a targeted feature set that includes monthly expense data across a plurality of categories, such as all categories except a particular category that is being analyzed (e.g., for determining whether a user's data for the particular category is anomalous).

In a particular embodiment, a machine learning model is learned based on categorized transaction data of a plurality of users to identify users that are similar to one another. For example, as described in more detail below with respect to FIGS. 1 and 2, all categorized transactions of a plurality of users may be collected, and an average monthly total amount of expenses for each category for each user may be determined. These values may be used to generate a data set for learning a clustering model that clusters users based on categorical monthly average expenses. For example, a clustering model may be learning through an unsupervised learning process based on a data set. In some embodiments, as described in more detail below with respect to FIG. 3, user feedback may guide which data points are included in the data set used to learn the model, thereby iteratively improving the functioning of the model.

In order to determine whether a user's average monthly expenses for a given category are anomalous, the machine learning model is used to determine other users that are similar to the user. For example, the user may be clustered with one or more other users by the machine learning model based on all categories except the given category. Once one or more similar users have been identified, an anomaly detection algorithm (e.g., based on z-scores or another type of anomaly detection algorithm) may be applied to the monthly average expenses for the given category for the user and corresponding monthly average expenses for the given category for the one or more similar users. In certain embodiments, the user's monthly average expense value for the given category is determined to be anomalous if this value differs by more than a threshold amount from corresponding values of similar users.

According to certain embodiments, one or more false positive detection rules may be applied to ensure that values determined to be anomalous are not outliers for a valid reason. For example, a false positive rule may specify that a seemingly anomalous expense value for a particular category is a false positive if the number of transactions for that category in a given month was more than a threshold amount higher than an average number of monthly transactions for that category for the user. For example, in such a case, it is unlikely that the user is paying an excessive amount for a particular category of goods or services, since the higher amount is likely due instead to a larger-than-usual volume of goods or services in that category being purchased.

Various actions may be taken if a value for a user is determined to be anomalous. For example, a notification may be provided to the user indicating that the user's average monthly expenses for the given category are anomalous and, in some embodiments, recommending actions that the user can take to potentially address the anomaly. For instance, if the user's monthly expenses in a given category are anomalously high, then one or more alternative vendors may be recommended to the user based on counterparties of transactions of other similar users with lower monthly expenses for the given category. In certain embodiments, the user may be provided with contact information of a recommended alternative vendor or a link to a web site of the alternative recommended vendor.

In some cases, a user may provide feedback indicating that a seemingly anomalous value is in fact expected. For example, the user may know why expenses in a certain category were unusually high, and may provide feedback indicating that the user does not consider the seemingly anomalous value to be an issue. In such cases, the seemingly anomalous value may be excluded from a data set for updating the model (e.g., the model may be re-generated by running an unsupervised learning algorithm on the updated data set) based on the user feedback in order to ensure that the value does not unduly impact future user similarity determinations. Furthermore, the seemingly anomalous value may be excluded from a data set used for future anomaly detection based on the user feedback in order to ensure that the value does not unduly impact future anomaly determinations.

Techniques described herein may be repeated for each category of data, with a separate user similarity determination being performed for each category (e.g., based on all categories except the category under consideration) or some subset of selected categories. Thus, the users determined to be similar for the anomaly detection process for a first category of a user may be different than the users determined to be similar for the anomaly detection process for a second category of the user (e.g., since the targeted feature set is different for each category, as it excludes only the category under consideration).

Embodiments of the present disclosure constitute a technical improvement with respect to conventional techniques for anomaly detection. For example, by utilizing a machine learning technique with targeted feature sets for identifying similar users based on certain categorical transactions, techniques described herein improve accuracy of identifying similar users for use in comparing categorical data for anomaly detection (e.g., as compared to identifying similar users based only on attributes such as business type and size). Categorical expense data of users, excluding the category being analyzed for anomaly detection purposes, provides more relevant and targeted information for determining similarity of users for categorical expense comparison purposes than generic business attributes, and allows a machine learning model to hone in on relevant data more efficiently.

Furthermore, by utilizing categorical expense data from a plurality of users as part of a machine learning technique for expense anomaly detection, embodiments of the present disclosure allow recommendations to be automatically generated and provided to users for remedying anomalous expense values, such as recommending alternative vendors that are indicated in other users' transaction data to offer better prices. For example, techniques described herein may involve providing user interface controls that connect a user with other vendors or users for reducing anomalous expenses. Thus, embodiments of the present disclosure provide improved user interfaces and improved computerized financial management as compared to conventional systems that do not provide such features.

Furthermore, embodiments of the present disclosure provide a self-improving machine learning process that is updated in an iterative manner based on new data and user feedback. For instance, by choosing which data points to use in updating a machine learning model and for anomaly detection based on user feedback (e.g., excluding values that users indicate to be unusually high for isolated, expected reasons), techniques described herein avoid drawbacks of purely automated data analysis, and provide continuous improvement through a feedback loop.

It is noted that, while embodiments are described herein with respect to particular types of machine learning models and particular types of values and categories (e.g., detecting anomalous expense values for accounts in a user's chart of accounts), techniques described herein may also be employed in other contexts. For example, more generally, techniques described herein involve automatically identifying similar entities based on targeted feature sets including categorized data related to the entities, and comparing data for specific categories for users determined to be similar to detect anomalies. Targeted feature sets, not being limited to categorized expense data of users, may include any types of categorical data associated with users. Similarity determinations, not being limited to any particular machine learning algorithms or types of features, may involve any set of categorical data, such as excluding data from a category that is being analyzed for anomaly detection purposes.

Example Computing Environment

FIG. 1 illustrates an example computing environment 100 for categorical anomaly detection utilizing machine learning models.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 includes an application 122, which generally represents a computing application that a user interacts with over network 110 via client 130. In some embodiments, application 122 is accessed via a user interface associated with client 130. In one example, application 122 comprises a financial management system that is configured to provide financial management services to a plurality of users.

According to one embodiment, application 122 is an electronic financial accounting system that assists users in book-keeping or other financial accounting practices. Additionally, or alternatively, the financial management system can manage one or more of tax return preparation, banking, investments, loans, credit cards, real estate investments, retirement planning, bill pay, and budgeting. Application 122 can be a standalone system that provides financial management services to users. Alternatively, the application 122 can be integrated into other software or service products provided by a service provider. In alternative embodiments, application 122 is not a financial management application, and performs other functions.

In one embodiment, application 122 can assist users in tracking expenditures and revenues by retrieving financial transaction data (e.g., user transactions 144) related to financial transactions of users and by enabling the users to categorize the financial transactions into accounts (e.g., included in user account data 146). Each user can have multiple accounts into which the user's financial transactions can be categorized, which may be referred to as the user's "chart of accounts". In some embodiments, accounts are common across all users, and correspond to taxable categories of expenditures and/or revenues. Application 122 may perform one or more aspects of categorical anomaly detection techniques described herein. For instance, application 122 may utilize a machine learning model 126 to determine entities similar to an entity, and may employ one or more anomaly detection algorithms to determine whether a value for a given category for the entity is anomalous compared to values for the given category of the other similar entities.

Model generator 124 uses categorized user transactions 144 to learn machine learning model 126, such as using unsupervised learning techniques. It is noted that the categories of categorized user transactions 144 may be features used in an unsupervised learning process, rather than being labels as in a supervised learning process. For example, machine learning model 126 may be a clustering model. Examples of clustering models include a Balanced Iterative Reducing and Clustering using Hierarchies (BIRCH) model, a k-means clustering model, and the like. Learning of machine learning model 126 may involve adding featurized data to a data set that is used to identify similarities among entities (e.g., users) based on features (e.g., using cosine similarity or other similarity metrics to identify entities with features that are similar to one another) of the entities, such as categorized transaction data.

In an example, categorized user transactions 144 include transactions that were categorized into accounts by a plurality of users. Each categorized user transaction 144 may indicate a user, an amount, and a category (e.g., account) in one example. In some embodiments, categorized user transactions 144 are used to determine monthly total expenses in each category for each user. Furthermore, an average monthly total of expenses for each category for each user may be determined, and may be included in a data set used to learn machine learning model 126. For example, machine learning model 126 may cluster users based on average monthly expenses in categories.

Once machine learning model 126 is learned, it may be used in a process for categorical anomaly detection. As described in more detail below with respect to FIG. 2, categorized user transactions 144 for a given user may be used to determine average monthly expenses for the given user in each category. Then, anomaly detection may be performed for each category based on users determined to be similar to the given user with respect to the given category. In an example, machine learning model 126 is used to cluster the given user with other users for a given category based on average monthly expenses for all categories except the given category. For instance, machine learning model 126 may cluster users based on cosine similarity between vectors comprising values for each of the categories (excluding the given category for which anomaly detection is being performed). Then, the average monthly expenses of the given user for the given category is compared to corresponding average monthly expenses for the given category of the other users clustered with the given user, such as using an anomaly detection algorithm. An example of an anomaly detection algorithm is determining whether a "z score" of a value relative to a set of values exceeds a threshold. A z score is generally defined as the difference between the value being evaluated and the mean of the set of values divided by the standard deviation of the set of values. This is included as an example, and other anomaly detection algorithms or techniques may be used in embodiments of the present disclosure.

If the average monthly expenses of the given user for the given category is determined to be anomalous based on the anomaly detection algorithm, one or more actions may be taken. In some embodiments, one or more false positive rules 148 are applied to ensure that the seemingly anomalous value is not a false positive. For example, a false positive rule 148 may specify that the number of transactions in the given category for the given user during the time period in question is more than a threshold amount higher than the average number of transactions for the user (or, in some embodiments, of all users in the cluster), then the seemingly anomalous value should be treated as a false positive.

For values determined to be anomalous, an anomaly message 152 may be sent to client 130. Anomaly message 152 may comprise, for example, an indication that the average monthly expenses of the given user for the given category was determined to be anomalous (e.g., statistically high) and, in some embodiments, a recommendation related to the anomaly. For example, a recommendation may be determined based on categorized user transactions 144 of other users clustered with the given user for the given category, such as by determining an alternative vendor that offers lower prices than a vendor currently indicated in transactions of the given user.

A window 132 is displayed within a user interface on client 130 based on anomaly message 152. Window 132 comprises an indication that the given user (e.g., which may represent a business) is paying more for a particular category of expenses (e.g., advertising) than other similar businesses. Window 132 comprises a user interface control 134 that, when selected, provides the user with additional information related to anomaly message 152. For example, selecting user interface control 134 may cause an additional window to be displayed with an indication of what other similar businesses pay for the category, a recommended alternative vendor, contact information for the alternative recommended vendor, a link to a website of the alternative vendor, a link to connect the user with another user that does business with an alternative recommended vendor, and/or the like.

Window 132 comprises another user interface control 136 that, when selected, allows the user to provide feedback related to window 132, such as an indication that the higher expense amount was expected or is otherwise not problematic. For instance, feedback provided by the user may be sent as feedback 154 to server 120 for use in updating machine learning model 126 (e.g., by excluding the anomalous value from a data set used to learn machine learning model 126) and/or selecting data points for use in future anomaly detection.

For instance, machine learning model 126 may be re-generated at regular intervals to ensure that clustering is performed based on recent data and to ensure that the data set used to learn the model excludes data that is indicated in user feedback to be anomalous for isolated, expected, and/or otherwise non-problematic reasons.

Data store 140 generally represents a data storage entity such as a database or repository that stores categorized user transactions 144, user account data 146, and false positive rules 148, which were described above. Categorized user transactions 144 include the transactions of one or more users (e.g., the user of client 130 and/or other users). User account data 146 includes users' charts of accounts. False positive rules 148 may be configured by an administrator or subject matter expert, and generally indicate conditions under which seemingly anomalous values should be treated as false positives (e.g., in which case no further action need be taken with respect to addressing the seemingly anoma-lous values). Categorized user transactions 144 may be updated over time as new transactions are categorized by users of application 122.

Client 130 generally represents a computing device such as a mobile phone, laptop or desktop computer, tablet computer, or the like. Client 130 is used to access application 122 over network 110, such as via a user interface associated with client 130. In alternative embodiments, application 122 (and, in some embodiments model generator 124, machine learning model 126, and/or data store 140) is located directly on client 130 or on one or more separate devices.

Example Categorical Anomaly Detection Through Machine Learning

Figure 2:
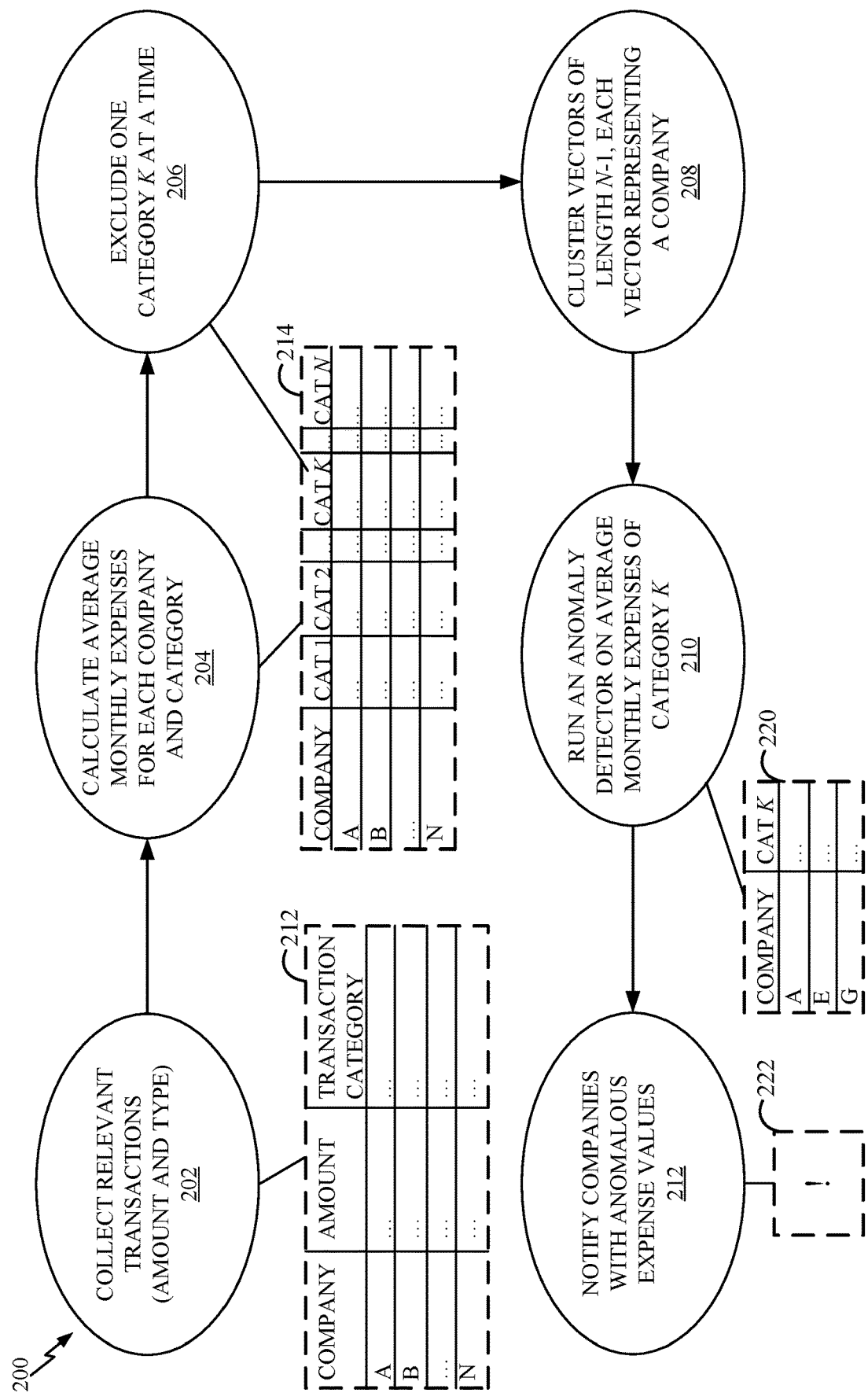
FIG. 2 depicts an example related to categorical anomaly detection through machine learning.

FIG. 2 depicts an example process 200 for categorical anomaly detection through using machine learning models.

Process 200 begins at stage 202, with collecting relevant transactions, which include an amount and type (e.g., category), of a plurality of users (e.g., representing companies A-N). For example, as shown in table 212, each transaction may be associated with a company, an amount, and a transaction category (e.g., account into which the transaction was categorized).

Process 200 continues at stage 204, with calculating average monthly expenses for each company and category. For example, as shown in table 214, for each company (e.g., companies A-X), an average monthly expense value is determined for categories 1-N.

Process 200 continues at stage 206, with excluding one category k at a time and stage 208 with clustering vectors of length N-1 (e.g., excluding k), each vector representing a company. For example, as shown in table 214, the values for category k may be excluded from vectors representing the companies when clustering the companies for anomaly detection for category k. In a particular example, vectors including values for categories 2-N are used when clustering companies for detecting anomalies in category 1, vectors including values for categories 1 and 3-N are used when clustering companies for detecting anomalies in category 2, and so on.

Process 200 continues at stage 210, with running an anomaly detector on average monthly expenses of category k. For example, as shown in table 220, the anomaly detector may be run on the values for category k for all of the companies in a cluster from category k (e.g., which, in this example, include companies A, E, and G) in order to determine whether the value for category k of a given company (e.g., company A) is anomalous compared to values for category k of other companies in the cluster. The anomaly detector may employ an anomaly detection algorithm or technique in order to determine whether a given value is an outlier compared to values of other similar companies.

Process 200 continues at stage 212, with notifying users associated with one or more companies that have anomalous expense values. For example, as shown in window 222, a message may be displayed in a user interface accessed by a user representing a company indicating that an average monthly expense value for category k of the company is anomalous. In some embodiments, additional information related to the anomalous value may be provided to the user, such as an indication of what other similar users pay for this category of expense, a recommended alternative vendor, contact information or a link related to the alternative vendor, and/or the like.

As explained in more detail below with respect to FIG. 3, the user may provide feedback related to the notification, and the feedback may be used to improve future clustering and/or anomaly detection processes.

Figure 3:
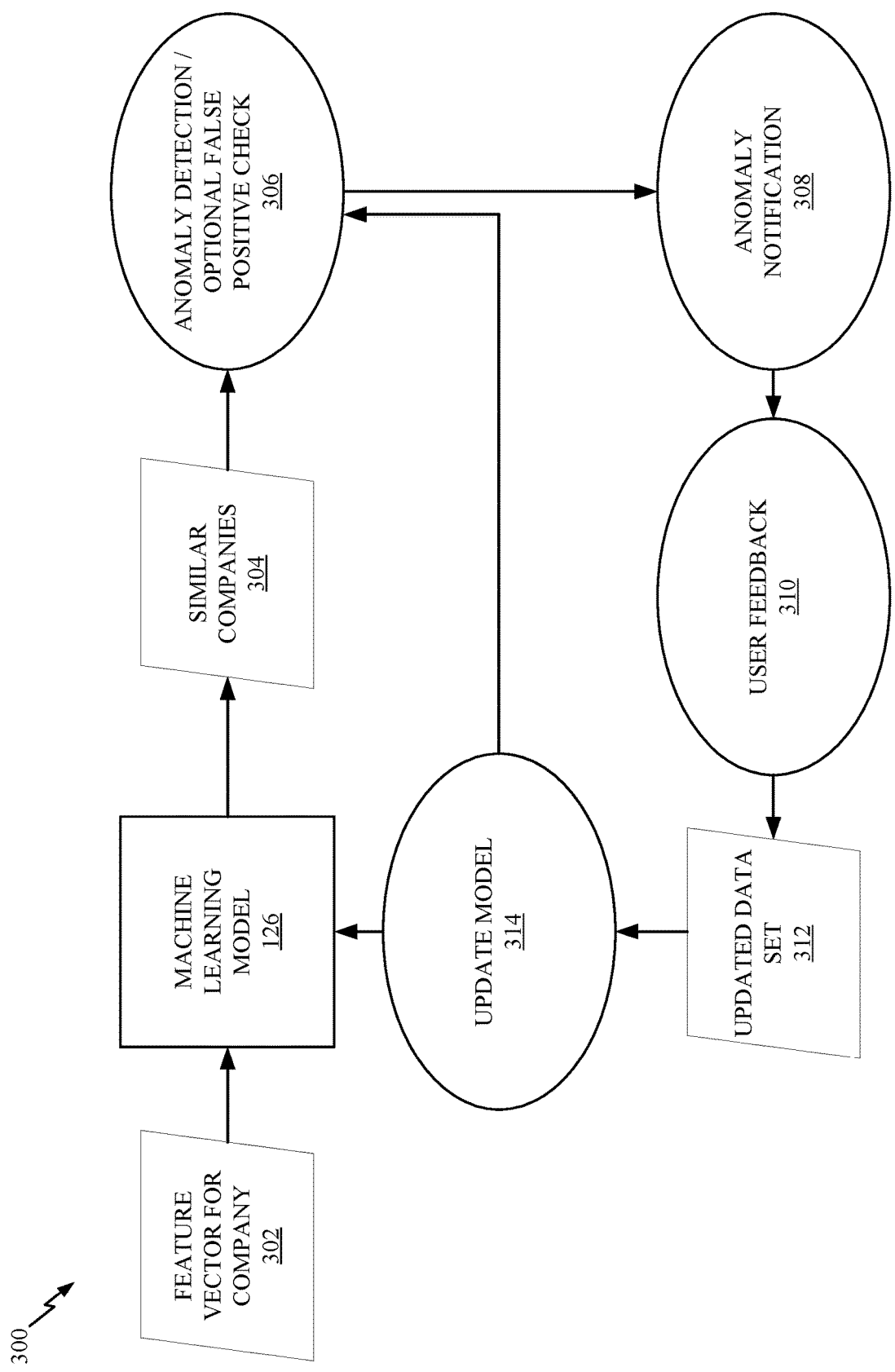
FIG. 3 depicts an example feedback loop related to categorical anomaly detection through machine learning.

Example Feedback Loop Related to Categorical Anomaly Detection Through Machine Learning FIG. 3 is an illustration 300 of an example feedback loop related to categorical anomaly detection using machine learning models. Illustration 300 includes machine learning model 126 of FIG. 1.

A feature vector 302 for a company is provided as one or more inputs to machine learning model 126. For example, feature vector 302 may include values for a user (e.g., representing a company) representing average monthly expenses for each of a plurality of categories, excluding a single category for which anomaly detection is being performed.

Similar companies 304 to the company are determined based on one or more outputs from machine learning model 126 in response to the one or more inputs. Similar companies 304 may include one or more companies that were clustered by machine learning model 126 with the company represented by feature vector 302 (e.g., based on feature vectors for the one or more companies including values for all categories except the category for which anomaly detection is being performed).

Anomaly detection 306 is then performed based on the identification of similar companies 304. For example, the company's average monthly expenses for the category under consideration may be compared to corresponding average monthly expenses for the category of the similar companies 204 in order to determine whether the company's average monthly expenses for the category are anomalous. For example, anomaly detection 306 may include determining whether a z-score exceeds a threshold, or may involve one or more other anomaly detection algorithms or techniques. In some cases, anomaly detection 306 may involve the use of one or more machine learning models trained to output indications of whether a value is anomalous relative to a set of values (e.g., using unsupervised learning techniques and/or supervised learning techniques, such as based on training data comprising sets of data labeled with indications of whether particular values are anomalous). In certain embodiments, a false positive check is also performed, such as applying one or more false positive rules to determine whether a seemingly anomalous value should be considered a false positive.

If the company's average monthly expense value for the category is determined to be anomalous as a result of anomaly detection 306 and/or the false positive check, then an anomaly notification 308 is generated. For example, anomaly notification 308 may comprise an indication that the company's average monthly expenses for the category are excessively high, and may be displayed to a user representing the company via a user interface. In some embodiments, anomaly notification 308 includes information related to the anomalous value, such as an explanation of how the anomaly was determined, information related to what other companies pay for goods or services in the category, recommended alternative vendors, contact information and/or links related to recommended alternative vendors, and/or the like. Anomaly notification 308 may also be associated with one or more user interface controls that allow the user to provide feedback related to anomaly notification 308, such as feedback indicating that the seemingly anomalous value was expected and/or otherwise not problematic for some reason.

User feedback 310 is provided by the user relative to anomaly notification 308, and indicates whether the seemingly anomalous value indicated by anomaly notification 308 is in fact a problematic anomaly that the user wishes to address. For example, user feedback 310 may indicate that the user expected the value to be unusually high for some known, acceptable reason (e.g., the user may know that a higher quantity or quality of goods and/or services in the category were purchased for a particular reason).

An updated data set 312 is generated based on user feedback 310. For example, the seemingly anomalous value may be excluded from updated data set 312 if user feedback 310 indicates that the seemingly anomalous value was expected or non-problematic for some isolated reason, which would indicate that the value is not indicative of a typical average monthly expense value for the company, and so this value would not be useful for determining companies that are similar to the company. Furthermore, such a seemingly anomalous value may also be excluded from data used for future anomaly detection 306, as it would not represent a typical value for the company.

Machine learning model 126 is updated at step 314 based on updated data set 312. For example, an unsupervised machine learning algorithm may be re-run on updated data set 312 to generate an updated version of machine learning model 126.

Thus, machine learning model 126 and the process for anomaly detection 306 may be continuously improved through a feedback loop in which user feedback is used to select which data points are utilized in future iterations.

Example Operations for Categorical Anomaly Detection Through Machine Learning

Figure 4:
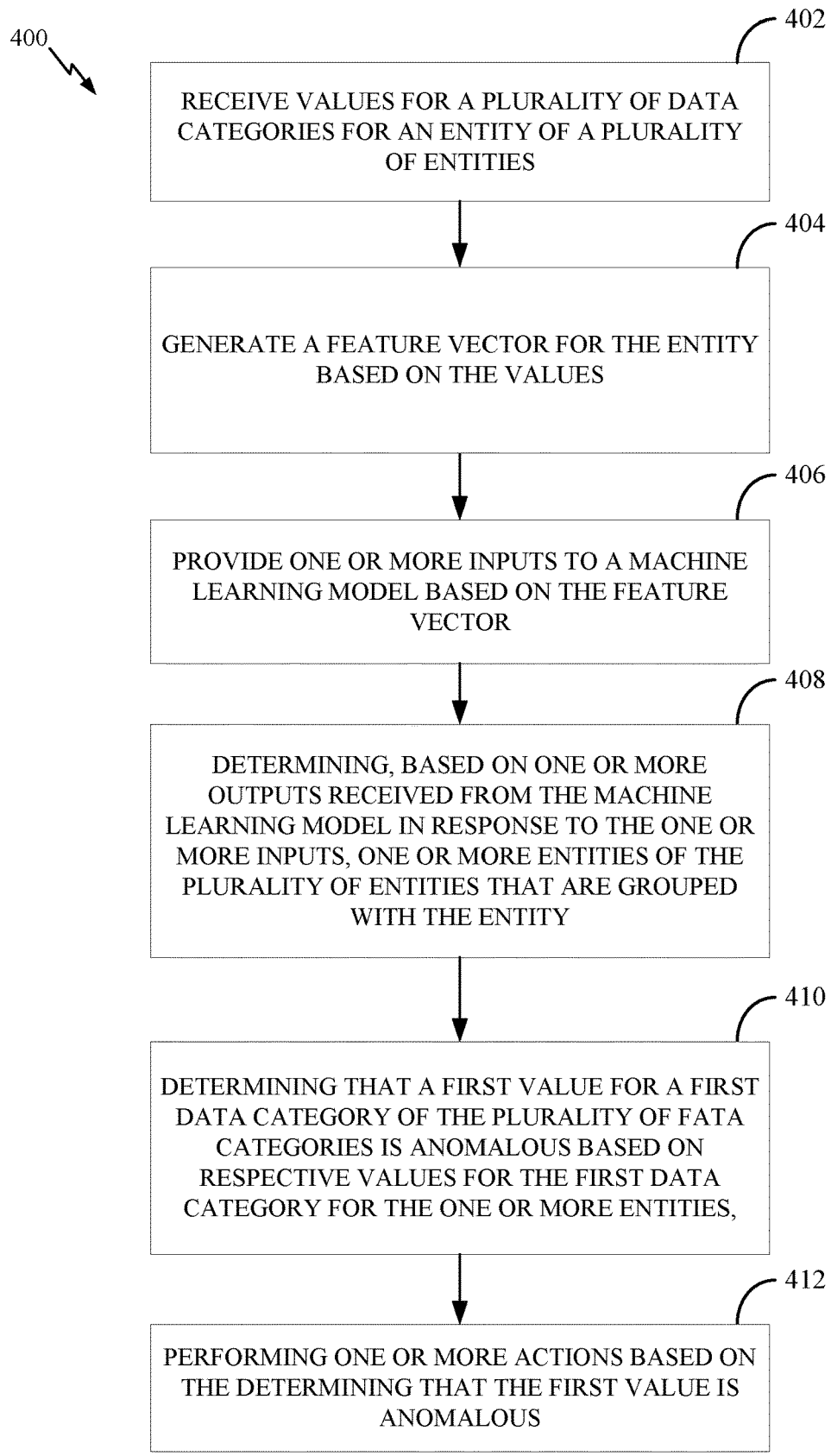
FIG. 4 depicts example operations for categorical anomaly detection through machine learning.

FIG. 4 depicts example operations 400 for categorical anomaly detection through machine learning. For example, operations 400 may be performed by one or more components of server 120 and/or client 130 of FIG. 1, such as application 122 of FIG. 1.

Operations 400 begin at step 402, with receiving values for a plurality of data categories for an entity of a plurality of entities. The entity may be, for example, a user (e.g., representing a business). For example, the values may be average monthly expense values for the data categories, which may correspond to accounts. It is noted that average monthly expenses for accounts are included as an example, and other types of values and data categories may be used with embodiments of the present disclosure. For instance, the values may be expenses in a category for a single month. In another example, the values may relate to amounts of user interactions with content in particular categories.

In some embodiments, the entity comprises a user of a software application, wherein the plurality of categories comprise financial accounts configured for the user in the software application, and the values are based on transactions of the user.

Operations 400 continue at step 404, with generating a feature vector for the entity based on the values. In some embodiments, the feature vector excludes a first value for a first data category of the plurality of data categories. For example, if there are a total of 3 categories, if the entity has a monthly average expense value for category 1 of $10,500, a monthly average expense value for category 2 of $2,000, and a monthly average expense value for category 3 of $56, and anomaly detection is being performed for category 2, then an example feature vector for the entity would be {10500, 56}.

Operations 400 continue at step 406, with providing one or more inputs to a machine learning model based on the feature vector. In some embodiments the feature vector is provided as the one or more inputs to the machine learning model. For example, the machine learning model may be a clustering model that was learned based on values for the plurality of data categories for a plurality of entities.

Operations 400 continue at step 408, with determining, based on one or more outputs received from the machine learning model in response to the one or more inputs, one or more other entities of the plurality of entities that are grouped with the entity. For example, an output received from the machine learning model may identify a cluster that the entity is clustered into, and the one or more other entities may also be part of the cluster.

Operations 400 continue at step 410, with determining that the first value is anomalous based on respective values corresponding to the first data category for the one or more other entities. In some embodiments, determining that the first value is anomalous comprises performing an anomaly detection algorithm with respect to the first value and the respective values (e.g., based on a Z-score or another anomaly detection technique) to determine an anomaly score for the first value and determining, based on the anomaly score for the first value exceeding a threshold, that the first value is anomalous. For example, if an average monthly expense value in a category for the entity is statistically higher by more than a threshold amount than corresponding monthly expense values for the category of the other entities with which the entity is clustered, then that average monthly expense value may be determined to be an anomaly. Some embodiments further comprise confirming that the first value is anomalous based on one or more false positive detection rules.

Operations 400 continue at step 412, with performing one or more actions based on the determining that the first value is anomalous. For instance, performing the one or more actions may comprise determining a recommendation related to the first category based on the determining that the first value is anomalous. The recommendation may be provided to the first entity via a user interface. In some embodiments, determining the recommendation comprises determining that a given value of the respective values for the first data category is lower than the first value and determining the recommendation based on a party associated with the given value. For example, providing the recommendation may comprise displaying one or more user interface components related to contacting the party.

Some embodiments further comprise receiving feedback from the first entity relating to the determining that the first value is anomalous. For example, the feedback may be used to generate an updated data set for updating the machine learning model, such as excluding the first value from the updated data set based on the feedback.

Example Computing Systems

Figure 5A:
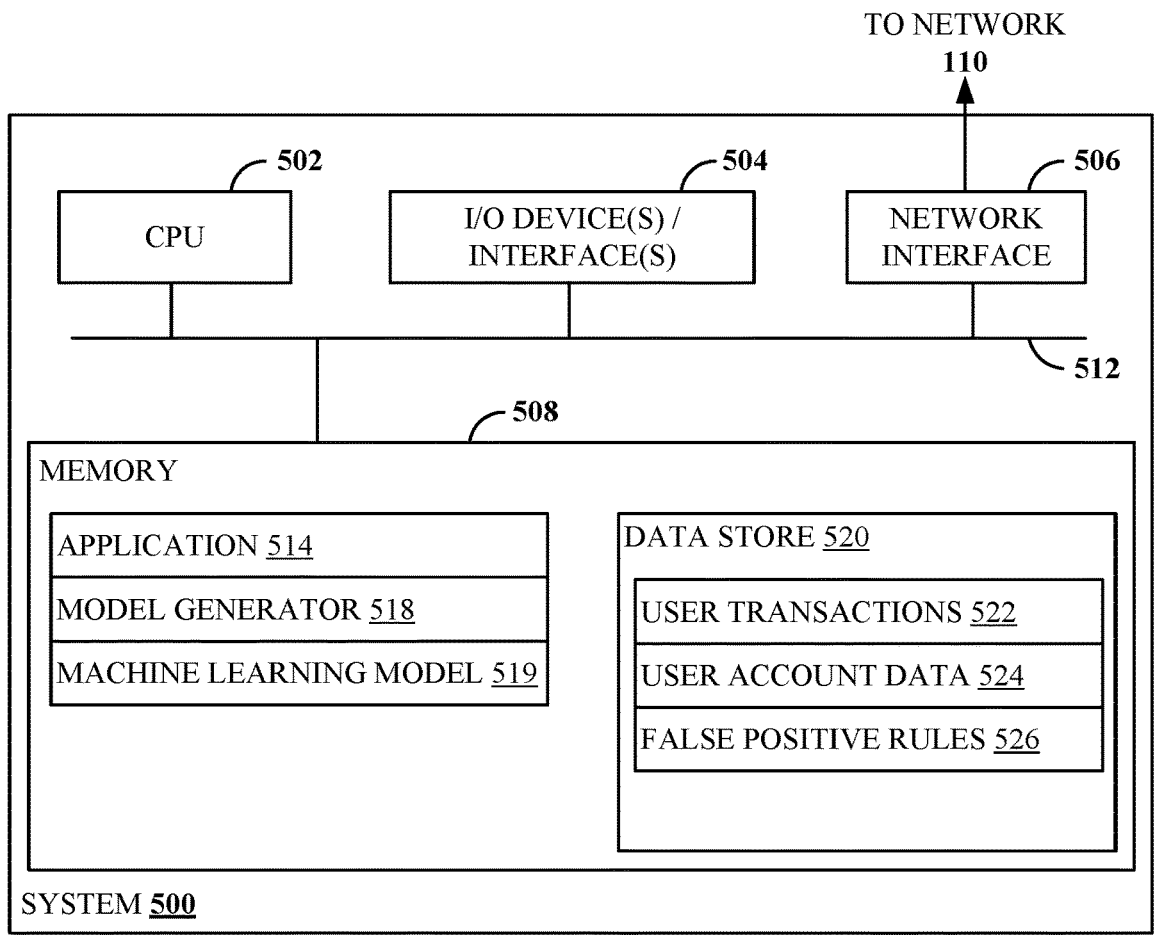
FIGS. 5A and 5B depict example processing systems for categorical anomaly detection through machine learning.

FIG. 5A illustrates an example system 500 with which embodiments of the present disclosure may be implemented. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110 (e.g., which may be network 110 of FIG. 1). It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, model generator 518, and machine learning model 519, which may be representative of application 122, model generator 124, machine learning model 126 of FIG. 1. Memory 508 further comprises data store 520, which may be representative of data store 140 of FIG. 1. While data store 520 is depicted in local storage of system 500, it is noted that data store 520 may also be located remotely (e.g., at a location accessible over a network, such as the Internet). Data store 520 includes user transactions 522, user account data 524, and false positive rules 526, which may be representative of categorized user transactions 144, user account data 146, and false positive rules 148 of FIG. 1.

Figure 5B:
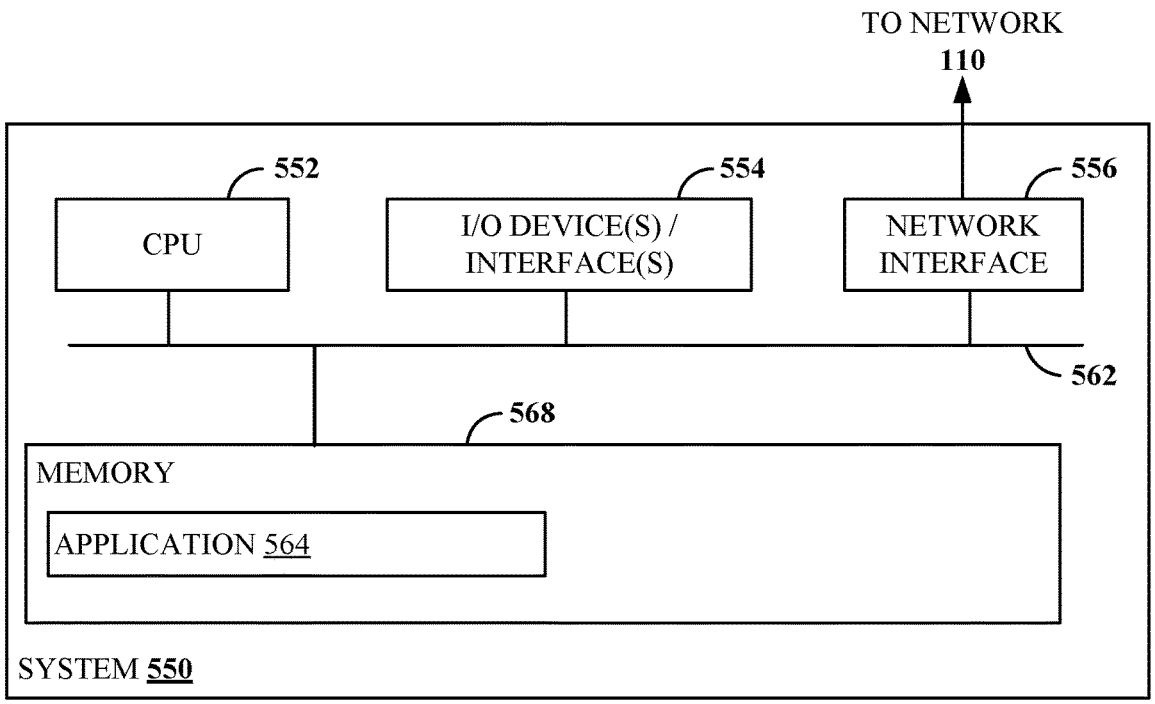

FIG. 5B illustrates another example system 550 with which embodiments of the present disclosure may be implemented. For example, system 550 may be representative of client 130 of FIG. 1.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, and an interconnect 552. It is contemplated that one or more components of system 550 may be located remotely and accessed via a network 110 (e.g., which may be network 110 of FIG. 1). It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, and memory 658. CPU 552 is included to be representative of a single CPU, multiple CPUs, a single CPU having multiple processing cores, and other arrangements.

Additionally, the memory 558 is included to be representative of a random access memory. In some embodiments, memory 558 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 558 includes an application 564, which may be representative of a client-side component corresponding to the server-side application 514 of FIG. 5A. For example, application 564 may comprise a user interface through which a user of system 550 interacts with application 514 of FIG. 5A. In alternative embodiments, application 514 is a standalone application that performs behavior prediction as described herein.

Example Clauses

Clause 1: A method for categorical anomaly detection through machine learning, comprising: receiving values for a plurality of data categories for an entity of a plurality of entities; generating a feature vector for the entity based on the values, wherein the feature vector excludes a first value for a first data category of the plurality of data categories; providing one or more inputs to a machine learning model based on the feature vector; determining, based on one or more outputs received from the machine learning model in response to the one or more inputs, one or more other entities of the plurality of entities that are grouped with the entity; determining that the first value is anomalous based on respective values for the first data category for the one or more other entities; and performing one or more actions based on the determining that the first value is anomalous.

Clause 2: The method of Clause 1, further comprising confirming that the first value is anomalous based on one or more false positive detection rules.

Clause 3: The method of any one of Clause 1-2, further comprising receiving feedback from the first entity relating to the determining that the first value is anomalous, wherein the feedback is used to generate an updated data set for updating the machine learning model.

Clause 4: The method of Clause 3, wherein the first value is excluded from the updated data set based on the feedback.

Clause 5: The method of any one of Clause 1-4, wherein performing the one or more actions based on the determining that the first value is anomalous comprises: determining a recommendation related to the first category based on the determining that the first value is anomalous; and providing the recommendation to the first entity via a user interface.

Clause 6: The method of Clause 5, wherein determining the recommendation comprises: determining that a given value of the respective values for the first data category is lower than the first value; and determining the recommendation based on a party associated with the given value.

Clause 7: The method of Clause 6, wherein providing the recommendation to the first entity via the user interface comprises displaying one or more user interface components related to contacting the party.

Clause 8: A method for categorical anomaly detection through machine learning, comprising: receiving values for a plurality of data categories for an entity of a plurality of entities; generating a feature vector for the entity based on the values, wherein the feature vector excludes a first value for a first data category of the plurality of data categories; providing one or more inputs to a machine learning model based on the feature vector; determining, based on one or more outputs received from the machine learning model in response to the one or more inputs, one or other more entities of the plurality of entities that are grouped with the entity; performing an anomaly detection algorithm with respect to the first value and the respective values to determine an anomaly score for the first value; determining that the first value is anomalous based on the anomaly score for the first value exceeding a threshold; and performing one or more actions based on the determining that the first value is anomalous.

Clause 9: The method of Clause 8, wherein the entity comprises a user of a software application, wherein the plurality of categories comprise financial accounts configured for the user in the software application, and wherein the values are based on transactions of the user.

Clause 10: The method of any one of Clause 8-9, further comprising confirming that the first value is anomalous based on one or more false positive detection rules.

Clause 11: The method of any one of Clause 8-10, further comprising receiving feedback from the first entity relating to the determining that the first value is anomalous, wherein the feedback is used to generate an updated data set for updating the machine learning model.

Clause 12: The method of Clause 11, wherein the first value is excluded from the updated data set based on the feedback.

Clause 13: The method of any one of Clause 8-12, wherein performing the one or more actions based on the determining that the first value is anomalous comprises: determining a recommendation related to the first category based on the determining that the first value is anomalous; and providing the recommendation to the first entity via a user interface.

Clause 14: The method of Clause 13, wherein determining the recommendation comprises: determining that a given value of the respective values for the first data category is lower than the first value; and determining the recommendation based on a party associated with the given value.

Clause 15: A system, comprising: one or more processors; and a memory storing instructions that, when executed by the one or more processors, cause the system to: receive values for a plurality of data categories for an entity of a plurality of entities; generate a feature vector for the entity based on the values, wherein the feature vector excludes a first value for a first data category of the plurality of data categories; provide one or more inputs to a machine learning model based on the feature vector; determine, based on one or more outputs received from the machine learning model in response to the one or more inputs, one or more other entities of the plurality of entities that are grouped with the entity; determine that the first value is anomalous based on respective values for the first data category for the one or more other entities; and perform one or more actions based on the determining that the first value is anomalous.

Clause 16: The system of Clause 15, wherein the instructions, when executed by the one or more processors, further cause the system to confirm that the first value is anomalous based on one or more false positive detection rules.

Clause 17: The system of any one of Clause 15-16, wherein the instructions, when executed by the one or more processors, further cause the system to receive feedback from the first entity relating to the determining that the first value is anomalous, wherein the feedback is used to generate an updated data set for updating the machine learning model.

Clause 18: The system of Clause 17, wherein the first value is excluded from the updated data set based on the feedback.

Clause 19: The system of any one of Clause 15-18, wherein performing the one or more actions based on the determining that the first value is anomalous comprises:

determining a recommendation related to the first category based on the determining that the first value is anomalous; and providing the recommendation to the first entity via a user interface.

Clause 20: The system of Clause 19, wherein determining the recommendation comprises: determining that a given value of the respective values for the first data category is lower than the first value; and determining the recommendation based on a party associated with the given value.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for categorical anomaly detection through machine learning, comprising:
   receiving values for a plurality of data categories for an entity of a plurality of entities;
   generating a feature vector for the entity based on the values, wherein the feature vector excludes a first value for a first data category of the plurality of data categories;
   providing one or more inputs to a machine learning model based on the feature vector;
   determining, based on one or more outputs received from the machine learning model in response to the one or more inputs, one or more entities of the plurality of entities that are grouped with the entity;
   determining that the first value is anomalous based on respective values for the first data category for the one or more entities;
   receiving feedback from the entity relating to the determining that the first value is anomalous;
   generating, based on the feedback, an updated data set for updating the machine learning mode, wherein the updated data set does not include the first value; and
   performing one or more actions based on the determining that the first value is anomalous.

2. The method of claim 1, further comprising confirming that the first value is anomalous based on one or more false positive detection rules.

3. The method of claim 1, wherein performing the one or more actions based on the determining that the first value is anomalous comprises:
   determining a recommendation related to the first data category based on the determining that the first value is anomalous; and
   providing the recommendation to the entity via a user interface.

4. The method of claim 3, wherein determining the recommendation comprises:
   determining that a given value of the respective values for the first data category is lower than the first value; and
   determining the recommendation based on a party associated with the given value.

5. The method of claim 4, wherein providing the recommendation to the entity via the user interface comprises displaying one or more user interface components related to contacting the party.

6. A method for categorical anomaly detection through machine learning, comprising:
   receiving values for a plurality of data categories for an entity of a plurality of entities;
   generating a feature vector for the entity based on the values, wherein the feature vector excludes a first value for a first data category of the plurality of data categories;
   providing one or more inputs to a machine learning model based on the feature vector;
   determining, based on one or more outputs received from the machine learning model in response to the one or more inputs, one or more entities of the plurality of entities that are grouped with the entity;
   performing an anomaly detection algorithm with respect to the first value and the respective values to determine an anomaly score for the first value;
   determining that the first value is anomalous based on the anomaly score for the first value exceeding a threshold; and
   performing one or more actions based on the determining that the first value is anomalous, comprising determining a recommendation related to the first data category based on the determining that the first value is anomalous, which comprises:

determining that a given value of the respective values for the first data category is lower than the first value; and determining the recommendation based on a party associated with the given value.

7. The method of claim 6, wherein the entity comprises a user of a software application, wherein the plurality of data categories comprise financial accounts configured for the user in the software application, and wherein the values are based on transactions of the user.

8. The method of claim 6, further comprising confirming that the first value is anomalous based on one or more false positive detection rules.

9. The method of claim 6, further comprising receiving feedback from the entity relating to the determining that the first value is anomalous, wherein the feedback is used to generate an updated data set for updating the machine learning model.

10. The method of claim 9, wherein the first value is excluded from the updated data set based on the feedback.

11. The method of claim 6, wherein performing the one or more actions based on the determining that the first value is anomalous further comprises:

providing the recommendation to the entity via a user interface.

12. A system, comprising:

one or more processors; and a memory storing instructions that, when executed by the one or more processors, cause the system to:

receive values for a plurality of data categories for an entity of a plurality of entities;

generate, for each data category of the plurality of data categories, a feature vector for the entity based on the values, wherein the feature vector excludes a value for the data category of the plurality of data categories;

provide one or more inputs to a machine learning model based on the feature vectors;

determine, based on one or more outputs received from the machine learning model in response to the one or more inputs, one or more entities of the plurality of entities that are grouped with the entity;

determine that the value for a given data category of the plurality of data categories is anomalous based on respective values for the given data category for the one or more entities; and perform one or more actions based on the determining that the value for the given data category of the plurality of data categories is anomalous.

13. The system of claim 12, wherein the instructions, when executed by the one or more processors, further cause the system to confirm that the value for the given data category of the plurality of data categories is anomalous based on one or more false positive detection rules.

14. The system of claim 12, wherein the instructions, when executed by the one or more processors, further cause the system to receive feedback from the entity relating to the determining that the value for the given data category of the plurality of data categories is anomalous, wherein the feedback is used to generate an updated data set for updating the machine learning model.

15. The system of claim 14, wherein the value for the given data category of the plurality of data categories is excluded from the updated data set based on the feedback.

16. The system of claim 12, wherein performing the one or more actions based on the determining that the value for the given data category of the plurality of data categories is anomalous comprises:

determining a recommendation related to the given data category based on the determining that the value for the given data category of the plurality of data categories is anomalous; and providing the recommendation to the entity via a user interface.

17. The system of claim 16, wherein determining the recommendation comprises:

determining that a given value of the respective values for the given data category is lower than the value for the given data category of the plurality of data categories; and determining the recommendation based on a party associated with the given value.

* * * * *